US012336461B2

(12) United States Patent
Miller et al.

(10) Patent No.: US 12,336,461 B2
(45) Date of Patent: Jun. 24, 2025

(54) IRRIGATION SYSTEM SHUT DOWN TIMING AS A FUNCTION OF DISTANCE FROM A CENTER OF ROTATION

(71) Applicant: Lindsay Corporation, Omaha, NE (US)

(72) Inventors: Mark William Miller, Omaha, NE (US); Bradford L. Ellison, Omaha, NE (US)

(73) Assignee: LINDSAY CORPORATION, Omaha, NE (US)

( * ) Notice: Subject to any disclaimer, the term of this patent is extended or adjusted under 35 U.S.C. 154(b) by 96 days.

(21) Appl. No.: 18/455,942

(22) Filed: Aug. 25, 2023

(65) Prior Publication Data

US 2025/0064003 A1 Feb. 27, 2025

(51) Int. Cl.
*A01G 25/16* (2006.01)
*A01G 25/09* (2006.01)

(52) U.S. Cl.
CPC ......... *A01G 25/165* (2013.01); *A01G 25/092* (2013.01)

(58) Field of Classification Search
CPC ............................ A01G 25/165; A01G 25/092
See application file for complete search history.

(56) References Cited

U.S. PATENT DOCUMENTS

| | | | |
|---|---|---|---|
| 2002/0066810 A1* | 6/2002 | Prandi | A01G 25/16 239/69 |
| 2002/0107582 A1 | 8/2002 | Pollak et al. | |
| 2004/0030456 A1 | 2/2004 | Barlow et al. | |
| 2008/0302987 A1 | 12/2008 | Corriveau | |
| 2018/0303048 A1 | 10/2018 | Edwards et al. | |
| 2020/0396911 A1 | 12/2020 | Stouffer et al. | |
| 2022/0030785 A1* | 2/2022 | Miller | H04Q 9/00 |
| 2022/0117192 A1* | 4/2022 | Delgado | E04H 17/06 |

OTHER PUBLICATIONS

International Search Report and Written Opinion in related PCT Application PCT/US2024/043204 mailed Dec. 10, 2024, 8 pages.

* cited by examiner

*Primary Examiner* — Chad G Erdman
(74) *Attorney, Agent, or Firm* — HOVEY WILLIAMS LLP

(57) ABSTRACT

A central processor for controlling a shut down of operations of an irrigation system after a problem is detected comprises a processing element configured to: monitor an operation of the irrigation system; determine a problem has occurred requiring a shut down of the operation of the irrigation system; and apply an algorithm to determine a timing of when to shut down the operation of the irrigation system.

11 Claims, 4 Drawing Sheets

IRRIGATION SYSTEM SHUT DOWN TIMING AS A FUNCTION OF DISTANCE FROM A CENTER OF ROTATION

FIELD OF THE INVENTION

Embodiments of the current invention relate to shut down procedures for an agricultural irrigation system.

BACKGROUND OF THE INVENTION

Agricultural irrigation systems typically comprise a plurality of towers that support a fluid-carrying conduit, wherein each tower includes a truss structure that retains a plurality of sprayers or nozzles. The irrigation system also includes a central processor for controlling operations and monitoring performance at the system level and a plurality of tower processors, with each tower processor controlling and monitoring tower operations and performance. Each tower further includes at least two wheels and one or more drive motors. Occasionally, one or more towers will have a fault or failure, such as local power failure, drive motor failure, wheel failure, being stuck in the mud or a rut, or the like, that prevents them from moving. The tower processor senses the fault or failure and reports it to the central processor. Additionally, due to reasons such as high wind or other phenomena that could physically move towers to an awkward or hazardous position, one or more towers may enter into an unsafe situation wherein a safety switch is activated. Furthermore, for numerous reasons, communication from one or more towers to the central processor may be disrupted. During a loss of communication, the concern is that the state of the one or more towers is unknown. If the central processor receives a failure notification or a safety switch activation, or if the central processor senses a loss of communication with one or more towers, then the central processor waits a brief period of time, known as a "debounce" time and lasting 2 or 3 seconds, and issues a shut down to the system—typically by opening a contactor which supplies electric power to all of the drive motors. Once a shutdown occurs, the irrigation system is nonoperational until the issue is resolved or the failed component is repaired or replaced. The drawback to a relatively quick shutdown, i.e., 2-3 seconds, is that, in some situations, the system may self correct or the problem may be overcome or minimized given sufficient time. For example, some irrigation systems may have both wired and wireless communication from each tower. If the wired communication from a tower fails, it may take a longer than 2-3 seconds for the wireless communication to configure itself and start providing communication. Also, in the case of a stopped tower, a portion of the system could still operate even after the faulty tower stops. The towers outward from the faulty tower could continue to provide irrigation until they advance to a certain angle relative to the other towers. Since they are shut down prematurely, there is a loss of irrigation.

SUMMARY OF THE INVENTION

Embodiments of the current invention address one or more of the above-mentioned problems and provide a distinct advance in the art of controlling how an irrigation system is shut down after a problem occurs. The current invention provides a central processor that applies some intelligence to the shut down process after a problem occurs at a tower of the irrigation system. The central processor broadly comprises a processing element that is configured to: monitor an operation of the irrigation system; determine a problem has occurred requiring a shut down of the operation of the irrigation system; and execute an algorithm to determine a timing of when to shut down the operation of the irrigation system.

Another embodiment of the current invention provides a method for controlling a shut down of operations of an irrigation system after a problem is detected, wherein the irrigation system includes a plurality of towers. The method comprises monitoring an operation of the irrigation system; determining a problem has occurred requiring a shut down of the operation of the irrigation system; and applying an algorithm to determine a timing of when to shut down the operation of the irrigation system.

Yet another embodiment of the current invention provides an irrigation system comprising a conduit, a plurality of towers, and a central processor. The conduit is configured to carry fluid for irrigating crops and includes a plurality of sections coupled to one another. The towers are configured to move the conduit. Each tower includes a truss section configured to support the conduit, and a motor configured to propel the tower. The central processor includes a processing element configured to: monitor an operation of the irrigation system; determine a problem has occurred requiring a shut down of the operation of the irrigation system; and execute an algorithm to determine a timing of when to shut down the operation of the irrigation system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
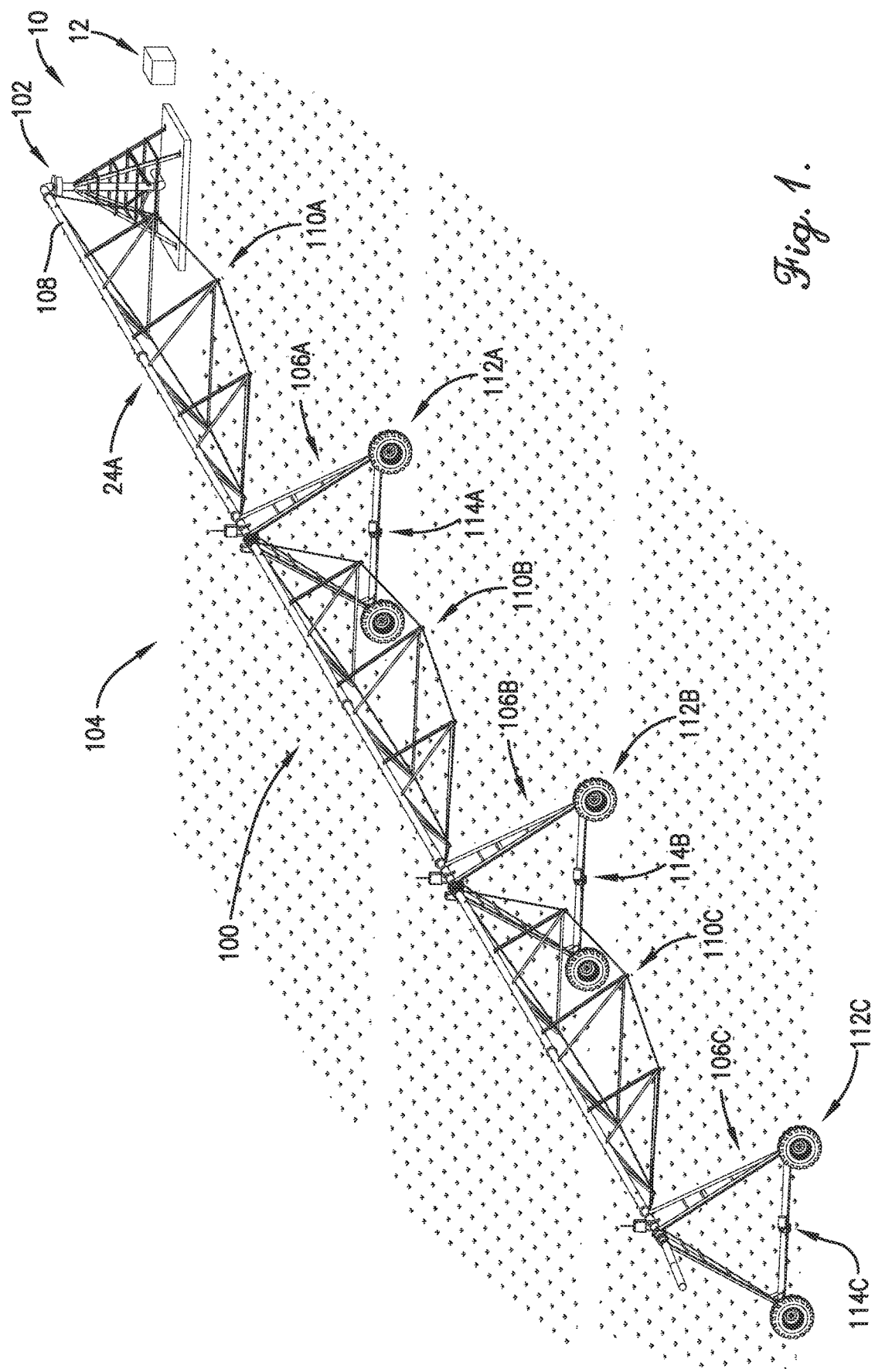
FIG. 1 is an environmental view of a control system, constructed in accordance with various embodiments of the invention, for use with an irrigation system that includes a central pivot and a plurality of towers, the control system configured for controlling a shut down of operations of the irrigation system after a problem has occurred.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 2:
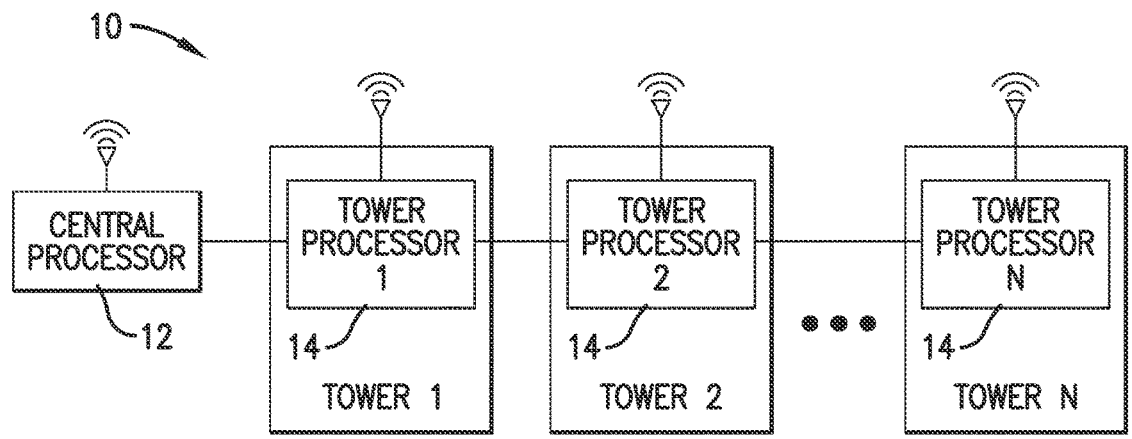
FIG. 2 is a schematic block diagram of the components of the control system including a central processor and a plurality of tower processors.

A control system 10, constructed in accordance with various embodiments of the current invention, for controlling a shut down of operations of an irrigation system 100 after a problem is detected is shown in FIGS. 1 and 2. The irrigation system 100 broadly comprises a central pivot 102 and a main section 104 that includes a plurality of towers 106. The problem may include one or more of the towers 106 has stopped, one or more of the towers 106 is positioned at an unsafe angle, one or more of the towers 106 has stopped communicating, and other situations requiring shut down of the irrigation system 100.

An exemplary embodiment of the irrigation system 100, shown in FIG. 1, is a central pivot irrigation system wherein the main section 104 is pivotally connected to the central pivot 102. The irrigation system 100 may also comprise an extension arm (also commonly referred to as a "swing arm" or "corner arm") pivotally connected to the free end of the main section 104. The irrigation system 100 may also be embodied by a lateral, or linear, move apparatus which irrigates while moving in a linear, or near-linear, direction without departing from the scope of the current invention. In addition, the terms "inward", "inbound", and "inboard" refer to a direction toward the central pivot 102, and the terms "outward", "outbound", and "outboard" refer to a direction away from the central pivot 102.

The central pivot 102 may be a fixed tower, or any other support structure, about which the main section 104 pivots. The central pivot 102 has access to a well, water tank, or other source of water and may also be coupled with a tank or other source of agricultural products to inject fertilizers, pesticides and/or other chemicals into the water for application during irrigation. The central pivot 102 supplies water to a conduit 108 or pipe which carries the water along the length of the main section 104.

The main section 104 may comprise any number of towers 106, the outermost of which is referred to herein as an end tower. In the exemplary embodiment of FIG. 1, the main section 104 includes three towers 106A, 106B, 106C. Each tower 106 is identified with a consecutive number, wherein the first tower 106A is identified with the number 1, and the end tower 106C is identified with the highest number—in this example, 3. The towers 106 are connected to the fixed central pivot 102 and to one another by truss sections 110A, 110B, 110C or other supports to form a number of interconnected spans. A length of each truss section 110 may be the same, or the length of one or more of the truss sections 110 may vary, so that a distance between adjacent towers 106 may be the same or may vary.

The towers 106 have wheels 112A, 112B, 112C, at least one of which is driven by suitable drive motors 114A, 114B, 114C. Each motor 114 turns at least one of its wheels 112 through a drive shaft to propel its tower 106 and thus the main section 104 in a circle about the central pivot 102 to irrigate a field. The motors 114 may also have several speeds or be equipped with variable speed drives. In various embodiments, each motor 114 may further include, or be coupled to, a gearbox configured to transfer power from the motor 114 to the wheels at low speeds with high torque. The operation of the motors 114, such as whether they are on or off, the speed of travel, and the direction of travel, may be controlled with one or more electronic signals and/or digital data. Furthermore, each motor 114 receives electric power from a single line which is electrically connected to an external power source. Typically, the electric power includes three-phase electric voltage. In addition, the irrigation system 100 includes a contactor, or switch, that controls the supply of electric power to the motors 114. The contactor has a closed position and an open position, wherein the position of the contactor is electronically controlled. When the contactor is closed, electric power is supplied to the motors 114. When the contactor is open, electric power is not supplied to the motors 114.

Each of the truss sections 110 carries or otherwise supports the conduit 108 and other fluid distribution mechanisms that are connected in fluid communication to the conduit 108. Fluid distribution mechanisms may include sprayers or diffusers, each optionally attached to a drop hose, or the like. In addition, the conduit 108 may include one or more valves which control the flow of water through the sprayers or diffusers. The opening and closing of the valves may be automatically controlled with an analog electronic signal and/or digital data.

The irrigation system 100 may also include an optional extension arm (not shown) pivotally connected to the end tower 106C and may be supported by a swing tower with steerable wheels driven by a motor. The extension arm may be joined to the end tower 106C by an articulating pivot joint. The extension arm is folded in relative to the end tower 106C when it is not irrigating a corner of a field and may be pivoted outwardly away from the end tower 106C while irrigating the corners of a field.

The irrigation system 100 illustrated in FIG. 1 has three towers 106A, 106B, 106C; however, it may comprise any number of towers, truss sections, wheels, and drive motors in various configurations without departing from the scope of the current invention.

Figure 3:
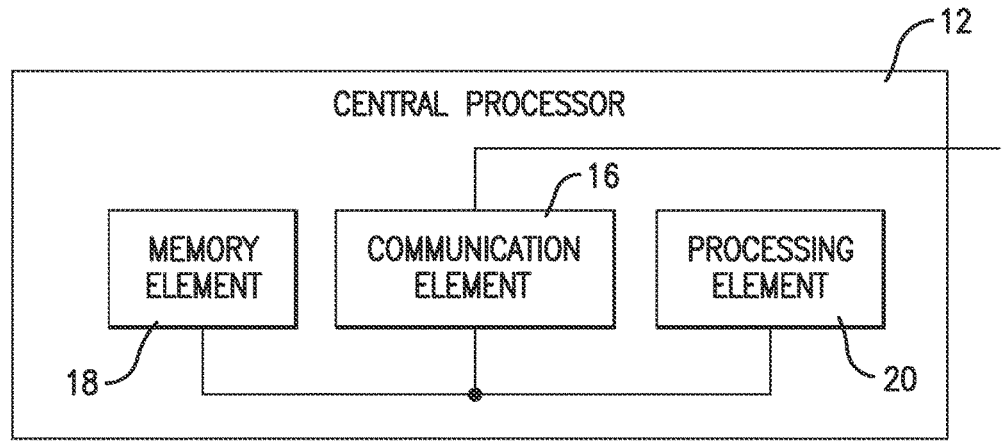
FIG. 3 is a schematic block diagram of the components of the central processor.

The control system 10 broadly comprises a central processor 12 and a plurality of tower processors 14, as shown in FIG. 2. The central processor 12 may monitor and/or manage the operation of the irrigation system 100 in general or the tower processors 14 in particular. The central processor 12 includes a communication element 16, a memory element 18, and a processing element 20, as shown in FIG. 3.

The communication element 16 generally allows the central processor 12 to communicate with other computing devices, external systems, computing networks, telecommunication networks, the Internet, and the like. The communication element 16 may include signal and/or data transmitting and receiving circuits, such as amplifiers, filters, mixers, oscillators, digital signal processors (DSPs), and the like. The communication element 16 may further include or be in electronic communication with one or more antennas. In addition, the communication element 16 may include components such as a network switch with multiple input/output ports that utilizes network communications protocols. The communication element 16 is in electronic communication with the memory element 18 and the processing element 20.

The communication element 16 may establish communication in a wired fashion through connectors or couplers that receive metal conductor wires or cables which are compatible with networking technologies such as ethernet. In certain embodiments, the communication element 16 may also couple with optical fiber cables. Alternatively, or in addition, the communication element 16 may establish communication wirelessly by utilizing radio frequency (RF) signals and/or data that comply with communication standards such as cellular 2G, 3G, 4G, Voice over Internet Protocol (VOIP), LTE, Voice over LTE (VOLTE), or 5G, Institute of Electrical and Electronics Engineers (IEEE) 802.11 standard such as WiFi, IEEE 802.16 standard such as WiMAX, Bluetooth™, or combinations thereof.

The memory element 18 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 18 may be embedded in, or packaged in the same package as, the processing element 20. The memory element 18 may include, or may constitute, a non-transitory "computer-readable medium". The memory element 18 may store the instructions, code, code statements, code segments, software, firmware, programs, applications, apps, services, daemons, or the like that are executed by the processing element 20. The memory element 18 is in electronic communication with the processing element 20 and may also store data that is received by the processing element 20 or the device in which the processing element 20 is implemented. The processing element 20 may further store data or intermediate results generated during processing, calculations, and/or computations as well as data or final results after processing, calculations, and/or computations. In addition, the memory element 18 may store settings, text data, documents from word processing software, spreadsheet software and other software applications, sampled audio sound files, photograph or other image data, movie data, databases, and the like.

The processing element 20 may comprise one or more processors. The processing element 20 may include electronic hardware components such as microprocessors (single-core or multi-core), microcontrollers, digital signal processors (DSPs), field-programmable gate arrays (FPGAs), analog and/or digital application-specific integrated circuits (ASICs), intelligence circuitry, or the like, or combinations thereof. The processing element 20 may generally execute, process, or run instructions, code, code segments, code statements, software, firmware, programs, applications, apps, processes, services, daemons, or the like. The processing element 20 may also include hardware components such as registers, finite-state machines, sequential and combinational logic, configurable logic blocks, and other electronic circuits that can perform the functions necessary for the operation of the current invention. In certain embodiments, the processing element 20 may include multiple computational components and functional blocks that are packaged separately but function as a single unit. In some embodiments, the processing element 20 may further include multiprocessor architectures, parallel processor architectures, processor clusters, and the like, which provide high performance computing. The processing element 20 may be in electronic communication with the other electronic components of the central processor 12 through serial or parallel links that include universal busses, address busses, data busses, control lines, and the like. In addition, the processing element 20 may include ADCs to convert analog electronic signals to (streams of) digital data values and/or digital to analog converters (DACs) to convert (streams of) digital data values to analog electronic signals.

The processing element 20 may be operable, configured, and/or programmed to perform the functions, operations, processes, methods, and/or algorithms of the central processor 12 by utilizing hardware, software, firmware, or combinations thereof. Other components, such as the communication element 16 and the memory element 18 may be utilized as well.

The central processor 12 transmits and receives data to and from the tower processors 14. The central processor 12 may be housed in a housing, such as a computer tower housing or similar, that is positioned on site with the irrigation system 100, such as near the central pivot 102. Or, the central processor 12 may be located off site from the irrigation system 100 and may communicate with the other components using the communication element 16 and a wireless communication network including "the cloud", the Internet, cellular and/or telephony networks, and the like.

The central processor 12 may also have (at least partial) control over the supply of electric power to the motors 114. The central processor 12 outputs a motor power control electronic signal which is binary in nature and has an asserted state and a deasserted state. When the motor power control electronic signal is asserted, electric power is supplied to the motors 114. When the motor power control electronic signal is deasserted, electric power is not supplied to the motors 114. In more detail, in exemplary embodiments, the motor power control electronic signal is output to a relay which switches on and off a higher voltage signal, such as 120 Volts (V) AC, to the contactor (described above) which switches on and off the three phase voltage to the motors. When the motor power control electronic signal is asserted, the relay receives 12 V DC, which switches on the higher voltage, which in turn closes the contactor which switches on the three phase voltage to the motors. When the motor power control electronic signal is deasserted, the relay receives 0 V DC, which switches off the higher voltage, which in turn opens the contactor which switches off the three phase voltage to the motors.

Figure 4:
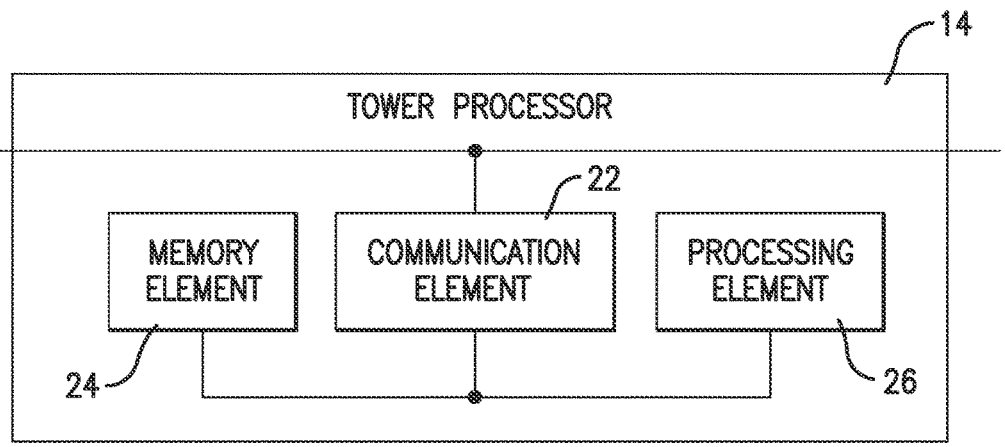
FIG. 4 is a schematic block diagram of the components of each tower processor.

Each tower processor 14 includes a communication element 22, a memory element 24, and a processing element 26, as shown in FIG. 4. The communication element 22, the memory element 24, and the processing element 26 have a structure that the same as, or substantially similar to, the like-named components described above. Each tower processor 14 may further include, or be in electronic communication with, a plurality of sensors configured to measure parameters such as rotation angles, geolocation, speed, parameters of the motor 114, parameters of the tires, parameters of the gearbox, fluid pressure, fluid flow, valve status, and the like. Each tower processor 14 transmits status data, including sensor readings, to the central processor 12. Each tower processor 14 receives control instructions, such as speed and direction of travel, along with other data from the central processor 12.

The tower processor 14 determines whether the data from the sensors is within a normal operating range. If the data from any of the sensors is outside the normal operating range, particularly if the data is within a critical operating range, then the tower processor 14 transmits a message to the central processor 12 requesting a shut down of the irrigation system 100.

The central processor 12 and the tower processors 14 typically communicate with each other through a serial link formed by a plurality of (electrically conductive) cables, as illustrated in FIG. 2. A first cable electrically connects the communication element 16 of the central processor 12 to the communication element 22 of the first tower processor 14. A successive one of the cables electrically connects the communication element 22 of each tower processor 14 to the communication element 22 of its outbound neighboring tower processor 14. The communication between the central processor 12 and the tower processors 14 may utilize packet-based network communications protocols, such as ethernet, in which each communication element 3A operates as a network node with a unique address. Communication involves one of the communication elements 3A transmitting packets that include the address of the destination. For example, when one of the tower processors 14 communicates with the central processor 12, the communication element 22 of the tower processor 14 transmits packets that include the address of the communication element 16 of the central processor 12.

Each tower processor 14 may utilize wireless communication as a backup if the wired connection is disrupted. The tower processor 14 may detect that the wired communication is not working, for example, by detecting a lack of periodic communication. In such a situation, the tower processor 14 may activate the wireless communication circuitry to start transmitting and receiving. The transition from wired communication to wireless communication may last longer than the debounce time.

The central processor 12 may receive a shut down request from any of the tower processors 14. Additionally, or alternatively, the central processor 12 may detect a loss of communication with any of the tower processors 14 (which may also require a shut down of the irrigation system 100). The central processor 12 then starts a timer that counts, for example, one-second intervals. The central processor 12 also determines the identification number of the tower 106 associated with the tower processor 14. The distance between adjacent towers 106, or roughly equivalently, the length of each truss section 110, is stored in the memory element 18. The central processor 12 retrieves the distance between adjacent towers 106 from the memory element 18 and multiplies it by the identification number of the tower 106 associated with the tower processor 14 having the problem in order to determine a total distance from the central pivot 102 to the problematic tower 106. The central processor 12 determines, computes, or calculates a wait time, which is a time period from when the central processor 12 determines there is a problem with one of the towers 106 (e.g., a failure, a loss of communication, etc.) until a shut down of the irrigation system 100 is required because damage to the irrigation system 100 is likely to occur. The wait time is calculated as a mathematical function of, or varies according to, the total distance and a speed of the end tower 106. The wait time may be determined by solving one or more mathematical equations that use the total distance and the speed of the end tower 106 as inputs. The total distance may be given in feet or meters. The speed may be given in feet per second or meters per second. The wait time may be determined in seconds.

Figure 5:
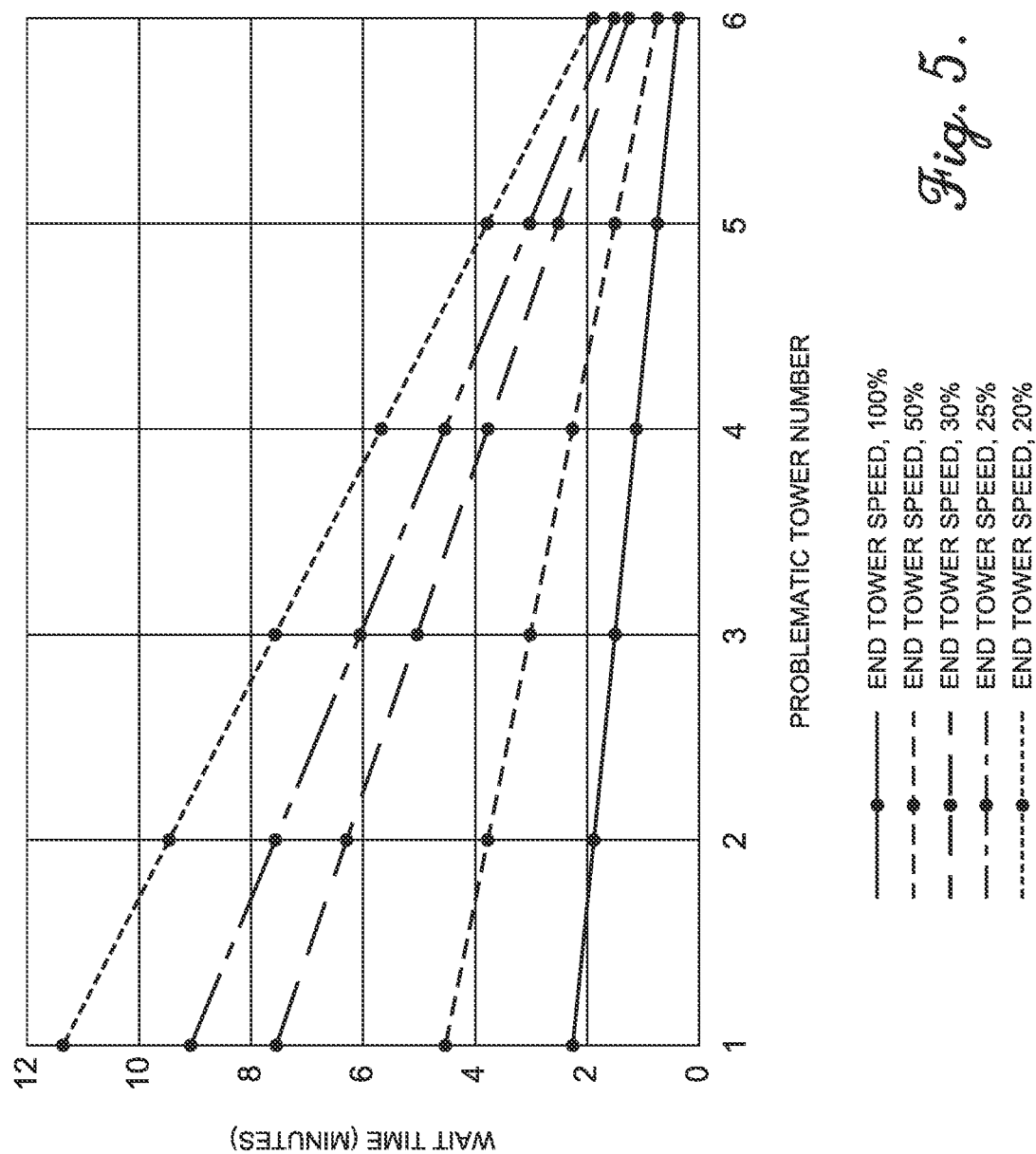
FIG. 5 is a plot of a wait time versus a problematic tower number for a plurality of speed values for a last tower.

An illustration of a plurality of linear equations that may be utilized for an exemplary irrigation system 100 to determine the wait time is shown in the plot of FIG. 5, wherein the wait time versus a problematic tower number is plotted for five different values of the speed of the end tower 106. The exemplary irrigation system 100 includes seven towers 106 in total. The distance between each tower 106 is known, so that the total distance can be calculated as a product of the tower number and the distance between each tower 106 if the distance between each tower 106 is constant. Alternatively, the total distance can be calculated as a sum of the distances between each tower 106 if the distance between each tower 106 is variable or constant. Or, the total distance from the central pivot 102 to each tower 106 (by identification number) is stored in the memory element 18. The central processor 12 may simply retrieve the total distance from the memory element 18 according to, or based on, the identification number of the problematic tower 106. Also, the speeds of the end tower 106 are given as a percentage of the maximum, or recommended, speed. And, the wait time is plotted in units of minutes. Values of the wait time for speeds in between those that are plotted can be determined using interpolation techniques.

In other embodiments, the central processor 12 determines the wait time by using a lookup table. An exemplary lookup table may include a plurality of entries wherein each entry includes three columns with a first column that has a value of the total distance, a second column that has a value of the speed of the end tower 106, and a third column that has a value of the wait time—wherein the wait time value is calculated using the mathematical equations described above with the listed total distance and speed as the inputs. In order to determine the wait time, the central processor 12 retrieves the entry that has the values of the total distance and speed for the current situation. The wait time is the wait time value from the retrieved entry.

Once the wait time is determined, the central processor 12 waits until the timer has a value equal to the wait time. At that point, the central processor 12 shuts down the irrigation system 100 by deasserting the motor power control electronic signal as discussed above. Deassertion of the motor power control electronic signal places the contactor in the open position, or opens the contactor, thereby removing electric power from the motors 114.

As can be seen from the plot of FIG. 5, the wait time is longer when the problematic tower 106 is closer to the central pivot 102. Conversely, the wait time is shorter when the problematic tower 106 is farther from the central pivot 102. In addition, the wait time is longer when the end tower 106 is traveling at a slower speed. Conversely, the wait time is shorter when the end tower 106 is traveling at a faster speed.

Figure 6:
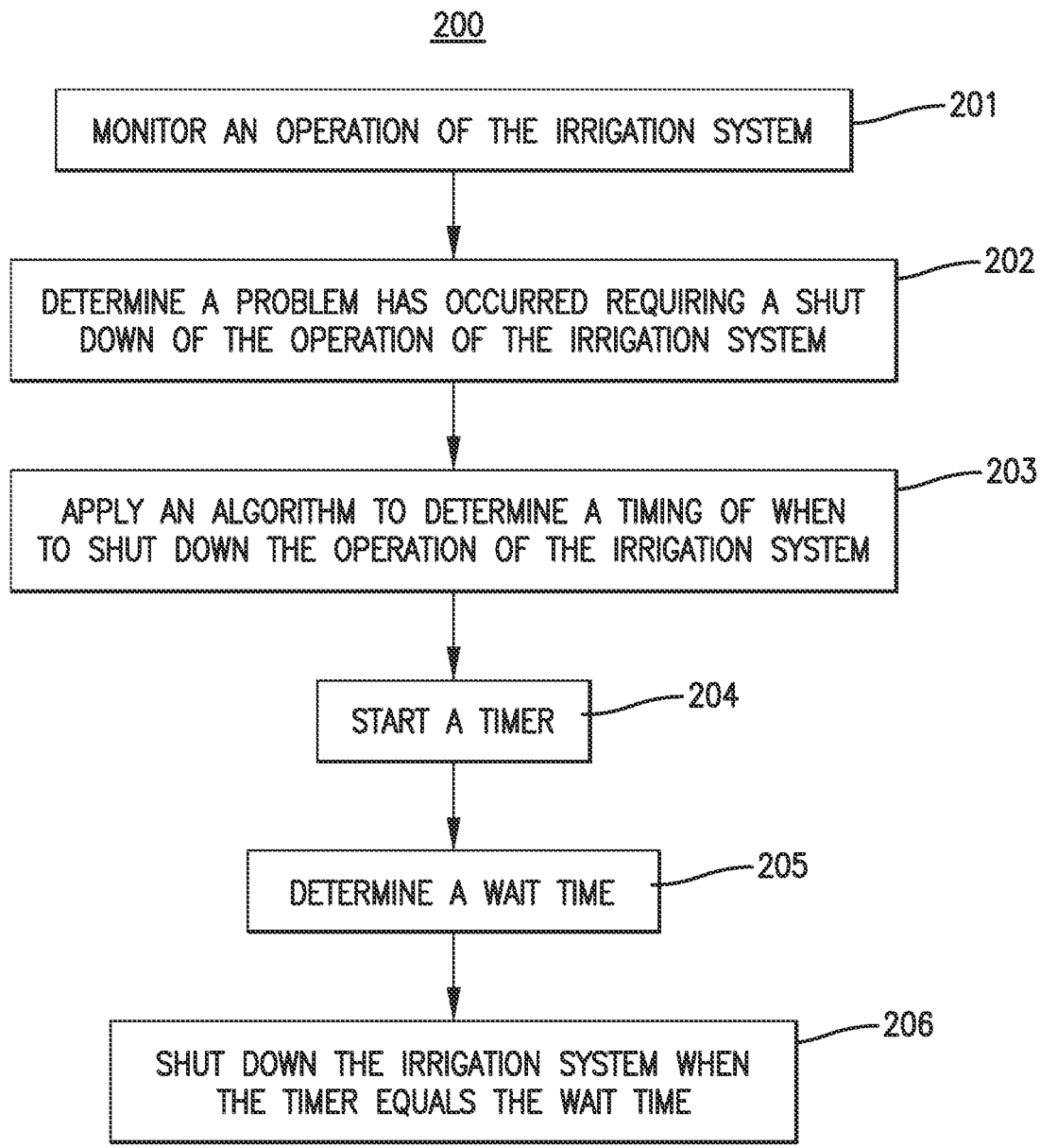
FIG. 6 is a listing of at least a portion of the steps of a method for controlling a shut down of operations of the irrigation system after a problem has occurred.

FIG. 6 depicts a listing of at least a portion of the steps of an exemplary computer-implemented method 200 for controlling a shut down of operations of an irrigation system 100 after a problem is detected. The steps may be performed in the order shown in FIG. 6, or they may be performed in a different order. Furthermore, some steps may be performed concurrently as opposed to sequentially. In addition, some steps may be optional or may not be performed. The steps may be performed by the processing element 20 of the central processor 12 via hardware, software, firmware, or combinations thereof. Furthermore, the steps may be implemented as instructions, code, code segments, code statements, a program, an application, an app, a process, a service, a daemon, or the like, and may be stored on a computer-readable storage medium, such as the memory element 18.

Referring to step 201, an operation of the irrigation system 100 is monitored. The irrigation system 100 is monitored by a central processor 12 which is in electronic communication with a plurality of tower processors 14. The central processor 12 includes a communication element 16, a memory element 18, and a processing element 20, as shown in FIG. 3. Each tower processor 14 includes a communication element 22, a memory element 24, and a processing element 26, as shown in FIG. 4. The like-named components are similar to one another. Each tower processor 14 may further include, or be in electronic communication with, a plurality of sensors configured to measure parameters such as rotation angles, geolocation, speed, parameters of the motor 114, parameters of the tires, parameters of the gearbox, fluid pressure, fluid flow, valve status, and the like. Each tower processor 14 transmits status data, including sensor readings, to the central processor 12. Each tower processor 14 receives control instructions, such as speed and direction of travel, along with other data from the central processor 12.

Referring to step 202, it is determined whether a problem has occurred requiring a shut down of the operation of the irrigation system. Each tower processor 14 determines whether the data from the sensors is within a normal operating range. If the data from any of the sensors is outside the normal operating range, particularly if the data is within a critical operating range, then the tower processor 14 transmits a message to the central processor 12 requesting a shut down of the irrigation system 100. The central processor 12 may receive a shut down request from any of the tower processors 14. Additionally, or alternatively, the central processor 12 may detect a loss of communication with any of the tower processors 14 (which may also require a shut down of the irrigation system 100).

Referring to steps 203 and 204, an algorithm is applied to determine a timing of when to shut down the operation of the irrigation system 100. The algorithm may include the following. Once it is determined to shut down the operation of the irrigation system 100, a timer is started (by the central processor 12) that counts, for example, one-second intervals.

Referring to step 205, a wait time is determined. The wait time is a time period from when the central processor 12 determines there is a problem with one of the towers 106 (e.g., a failure, a loss of communication, etc.) until a shut down of the irrigation system 100 is required. The central processor 12 determines the identification number of the tower 106 associated with the tower processor 14. The distance between adjacent towers 106, or roughly equivalently, the length of each truss section 110, is stored in the memory element 18. The central processor 12 retrieves the distance between adjacent towers 106 from the memory element 18 and multiplies it by the identification number of the tower 106 associated with the tower processor 14 having the problem in order to determine a total distance from the central pivot 102 to the problematic tower 106. Alternatively, the total distance can be calculated as a sum of the distances between each tower 106 up to the problematic tower 106. Or, the total distance from the central pivot 102 to each tower 106 (by identification number) is stored in the memory element 18. The central processor 12 may simply retrieve the total distance from the memory element 18 according to, or based on, the identification number of the problematic tower 106. The wait time is calculated as a mathematical function of, or varies according to, the total distance and a speed of the end tower 106. The wait time may be determined by solving one or more mathematical equations that use the total distance and the speed of the end tower 106 as inputs. The total distance may be given in feet or meters. The speed may be given in feet per second or meters per second. The wait time may be determined in seconds.

In other embodiments, the wait time is determined by using a lookup table. An exemplary lookup table may include a plurality of entries wherein each entry includes three columns with a first column that has a value of the total distance, a second column that has a value of the speed of the end tower 106, and a third column that has a value of the wait time—wherein the wait time value is calculated using the mathematical equations described above with the listed total distance and speed as the inputs. In order to determine the wait time, the central processor 12 retrieves the entry that has the values of the total distance and speed for the current situation. The wait time is the wait time value from the retrieved entry.

Referring to step 206, the irrigation system 100 is shut down when the timer equals the wait time. Once the wait time is determined, the central processor 12 waits until the timer has a value equal to the wait time. At that point, the central processor 12 shuts down the irrigation system 100 by deasserting the motor power control electronic signal as discussed above. Deassertion of the motor power control electronic signal places the contactor in the open position, or opens the contactor, thereby removing electric power from the motors 114.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A central processor for controlling a shut down of operations of an irrigation system after a problem is detected, wherein the irrigation system includes a plurality of towers, the central processor comprising:
 a processor configured to:
  monitor an operation of the irrigation system;
  determine a problem has occurred requiring a shut down of the operation of the irrigation system;
  start a timer;

determine a total distance from a central pivot of the irrigation system to the tower associated with the problem;
determine a speed of an end tower;
calculate a wait time as a mathematical function of the total distance and the speed of the end tower; and
shut down the operation of the irrigation system when the timer is equal to the wait time.

2. The central processor of claim 1, wherein to determine the problem has occurred, the processor is further configured to perform at least one of receiving a shut down request from one or more tower processors associated with the towers, and detecting a loss of communication with one or more tower processors.

3. The central processor of claim 1, wherein to shut down the operation of the irrigation system, the processor is further configured to output an electronic signal that removes electric power from a plurality of motors of the irrigation system.

4. A method for controlling a shut down of operations of an irrigation system after a problem is detected, wherein the irrigation system includes a plurality of towers, the method comprising:
monitoring an operation of the irrigation system;
determining a problem has occurred requiring a shut down of the operation of the irrigation system;
starting a timer;
determining a total distance from a central pivot of the irrigation system to the tower associated with the problem;
determining a speed of an end tower;
calculating a wait time as a mathematical function of the total distance and the speed of the end tower; and
shutting down the operation of the irrigation system when the timer is equal to the wait time.

5. The method of claim 4, wherein determining the problem has occurred includes performing at least one of receiving a shut down request from one or more tower processors associated with the towers, and detecting a loss of communication with one or more tower processors.

6. The method of claim 4, wherein shutting down the operation of the irrigation system includes outputting an electronic signal that removes electric power from a plurality of motors of the irrigation system.

7. An irrigation system comprising:
a conduit configured to carry fluid for irrigating crops, the conduit including a plurality of sections coupled to one another;
a plurality of towers configured to move the conduit, each tower including:
a truss section configured to support the conduit, and
a motor configured to propel the tower; and
a central processor comprising a processor configured to:
monitor an operation of the irrigation system;
determine a problem has occurred requiring a shut down of the operation of the irrigation system;
start a timer;
determine a total distance from a central pivot of the irrigation system to the tower associated with the problem;
determine a speed of an end tower;
calculate a wait time as a mathematical function of the total distance and the speed of the end tower; and
shut down the operation of the irrigation system when the timer is equal to the wait time.

8. The irrigation system of claim 7, wherein to determine the problem has occurred, the processor is further configured to perform at least one of receiving a shut down request from one or more tower processors associated with the towers, and detecting a loss of communication with one or more tower processors.

9. The irrigation system of claim 7, wherein to shut down the operation of the irrigation system, the processor is further configured to output an electronic signal that removes electric power from the motors.

10. A central processor for controlling a shut down of operations of an irrigation system after a problem is detected, wherein the irrigation system includes a plurality of towers, the central processor comprising:
a processor configured to:
monitor an operation of the irrigation system;
determine a problem has occurred requiring a shut down of the operation of the irrigation system;
start a timer;
determine a total distance from a central pivot of the irrigation system to the tower associated with the problem;
determine a speed of an end tower;
retrieve a wait time from a lookup table using the total distance and the speed of the end tower to find an entry in the lookup table; and
shut down the operation of the irrigation system when the timer is equal to the wait time.

11. A method for controlling a shut down of operations of an irrigation system after a problem is detected, wherein the irrigation system includes a plurality of towers, the method comprising:
monitoring an operation of the irrigation system;
determining a problem has occurred requiring a shut down of the operation of the irrigation system;
starting a timer;
determining a total distance from a central pivot of the irrigation system to the tower associated with the problem;
determining a speed of an end tower;
retrieving a wait time from a lookup table using the total distance and the speed of the end tower to find an entry in the lookup table; and
shutting down the operation of the irrigation system when the timer is equal to the wait time.

* * * * *